United States Patent [19]

Harris

[11] Patent Number: 4,921,312

[45] Date of Patent: May 1, 1990

[54] VEHICLE ANTI-LOCK BRAKING SYSTEM

[75] Inventor: Alan L. Harris, Coventry, England

[73] Assignee: Lucas Industries public limited company, Birmingham, England

[21] Appl. No.: 344,572

[22] Filed: Apr. 28, 1989

[30] Foreign Application Priority Data

May 7, 1988 [GB] United Kingdom ............... 8810861

[51] Int. Cl.$^5$ .............................................. B60T 8/58
[52] U.S. Cl. .................................. 303/100; 303/6.01; 303/102; 303/103; 303/116
[58] Field of Search ................................. 303/91–119, 303/6.01, 9.62–9.76, 1, 22.1, 24.1; 188/181, 349; 280/703; 180/197, 244, 233

[56] References Cited

U.S. PATENT DOCUMENTS

| 4,251,118 | 2/1981 | Rothen et al. | 303/91 |
| 4,414,630 | 11/1983 | Harris et al. | 303/97 X |
| 4,701,855 | 10/1987 | Fennel | 303/105 X |

FOREIGN PATENT DOCUMENTS 3435866  4/1986  Fed. Rep. of Germany ...... 303/100

Primary Examiner—Douglas C. Butler
Attorney, Agent, or Firm—Scrivener and Clarke

[57] ABSTRACT

An anti-lock system for vehicle brakes of the type wherein a computer is used to process data received from wheel speed transducers and to control the release of the brake of a particular wheel when the deceleration and/or slip of that wheel exceeds predetermined thresholds. In order to increase the immunity of the system to road irregularities while maintaining skid detection sensitivity, it is arranged that, during periods that anti-lock is not currently evoked, the detection of a road bump at the front axle is used to cause the rear axle anti-lock system to be temporarily de-sensitized just before it would be expected, on the basis of speed and wheel-base, to reach the same bump. Bump recognition at the front wheel(s) is achieved by identifying those occasions when front wheel speed deviation exceeds a predetermined "window" threshold level which is chosen to correspond to the bump severity needed to overcome the normal rear axle "first cycle" threshold but which does not meet the criteria needed to evoke the front axle anti-lock system.

4 Claims, 3 Drawing Sheets

VEHICLE ANTI-LOCK BRAKING SYSTEM

DESCRIPTION

The present invention is concerned with anti-lock systems for vehicle brakes of the type wherein a computer is used to process data received from wheel speed transducers and to control the release of the brake of a particular wheel when the deceleration and/or slip of that wheel exceeds predetermined thresholds.

The conventional practice is for the brake pressure to be released and re-applied cyclically to a skidding wheel until skidding stops and "normal" wheel deceleration is achieved.

With the increasing priority being given to the operational "comfort" of modern anti-lock systems, attention has been given to the problem of premature operation of such systems in response to road bumps which can cause unwanted noise and pedal vibration. In order to reduce this problem it has been the practice to set the skid detection thresholds to higher than normal values for the first cycle of anti-lock operation in order to try to eliminate triggering of the anti-lock operation by all but the most severe road bumps. However, for some vehicles it has been found to be difficult to reach an acceptable compromise for the rear axle, between immunity to road irregularities and the provision of acceptable handling during steering manoeuvres. Systems which do not include a so-called "hold before dump" facility are particularly susceptible to this problem.

It is therefore an object of the present invention to provide the rear axle brakes of a vehicle with effective immunity to road irregularities whilst maintaining the skid detection sensitivity needed to ensure vehicle stability during steering manoeuvres.

In accordance with the present invention, this is achieved in that, during periods that anti-lock is not currently evoked, the detection of a road bump at the front axle is used to cause the rear axle anti-lock system to be temporarily de-sensitised just before it would be expected, on the basis of speed and wheel-base, to reach the same bump.

The imminent arrival of the rear wheel(s) at the detected bump can be predicted in any convenient manner, for example solving the well-known formula $s = ut + \frac{1}{2}at^2$ (where s=distance (=wheelbase−error margin), u=current velocity, a=acceleration/deceleration and t=time before wheel hits bump), or preferably, by integrating the vehicle reference speed over successive measurement periods, until the accumulated total=s=(wheelbase−a predetermined error margin). Bump recognition at the front wheel(s) can be achieved by identifying those occasions when front wheel speed deviation exceeds a predetermined "window" threshold level which is chosen to correspond to the bump severity needed to overcome the normal rear axle "first cycle" threshold but which does not meet the criteria needed to evoke the front axls anti-lock system.

The invention is described further hereinafter, by way of example only, with reference to the accompanying drawings, in which:

FIG. 1 is a simplified diagram illustrating a typical conventional anti-lock braking system to which the present invention is applicable. It is shown by way of example only and the invention is not limited solely to systems of this particular configuration.

Figure 1:
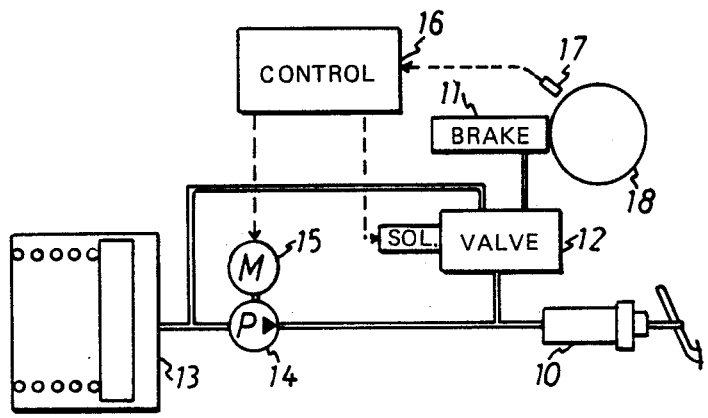
FIG. 1 is a diagram showing the basic construction of a typical known anti-lock braking system.

The simplified single-channel system of FIG. 1 includes a conventional master cylinder 10 and slave cylinder 11 for applying the brake to a wheel 18. The master cylinder 10 and slave cylinder 11 are connected together by a valve 12 which is usually solenoid operated and, when not energised, provides a direct connection between the master cylinder and the slave cylinder. When energised, the valve 12 substantially blocks this direct connection and also opens a connection to a low pressure reservoir 13. A pump 14 operable by an electric motor 15 connects the low pressure reservoir 13 to the master cylinder.

An electronic control circuit 16 forming part of a control computer for the anti-lock system controls the solenoid of the valve 12 and the motor 15. The control derives an input from a wheel speed transducer 17.

The control circuit 16 operates in known manner to monitor the rate of change of the frequency of the signals supplied thereto by the wheel speed transducer 17. During braking, if the rate of this frequency exceeds a first threshold, indicating that the wheel monitored is being decelerated (rate of change of frequency) too rapidly, or a second threshold, indicating that the wheel is slipping (variation of wheel speed from vehicle reference speed) relative to the road surface, then the solenoid of the valve 12 is energised so that the connection between the master cylinder 10 and the slave cylinder is blocked or substantially blocked, and the pressure in the slave cylinder is relieved by fluid being dumped from the slave cylinder into the reservoir 13. This permits rapid reduction of the braking effort. At the same time, the motor 15 is energised so that the pump begins to run. When the control circuit 16 detects the resulting change in the rate of reduction of the frequency, the solenoid is de-energised again, but the motor 15 is not de-energised yet.

In a conventional system, each time the solenoid valve 12 is energised, a software timer in the control circuit 16, with a fixed, relatively long period of about one second, is started and the motor 15 is energised until this timer times out. In a genuine anti-skid operation there will be a succession of actuations and de-actuations of the solenoid valve and the timer will be restarted on each actuation.

It should be emphasised that although FIG. 1 shows only a single channel (i.e. one brake and one wheel), there is of course normally a separate pressure control loop associated with each controlled wheel of the vehicle, each such pressure control loop comprising a respective solenoid valve 12, brake actuator 11 and speed sensor 17 operated by the common control unit 16.

Figure 2:
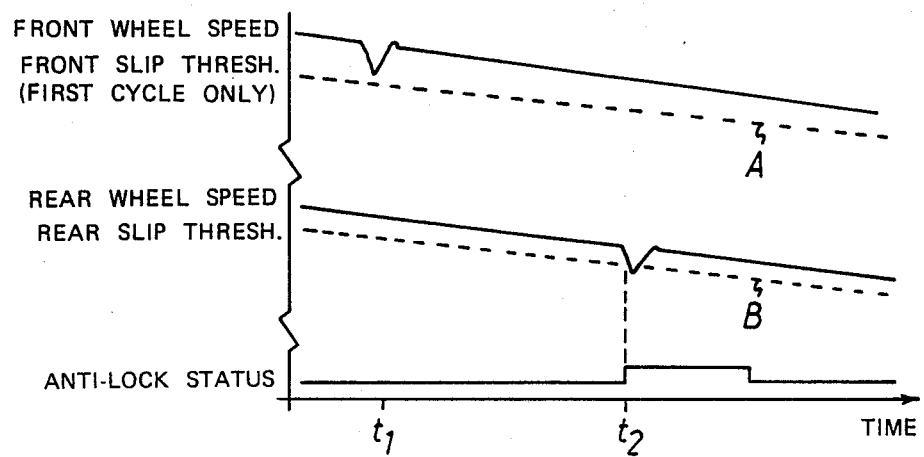
FIG. 2 illustrates graphically the operation of a known anti-lock system.

Referring now to FIG. 2, in the typical known system the threshold for detection of wheel slip at the front wheel of a vehicle (indicated by chain line A) during the first cycle of anti-lock operation is set sufficiently high that the drop in wheel speed at time $t_1$ caused by that wheel passing over a road bump does not trigger anti-lock operation. However, due to the more sensitive threshold (chain line B) which has to be set at the rear wheel, the same road bump reaching the rear wheel at time $t_2$ does cause sufficient slowing of the wheel to trigger the anti-lock system—even though there is no cause to do so in fact. This situation arises in particular in those vehicles whose combination of braking and suspension characteristics produce a large response to road bumps but which demand high sensitivity to maintain safe handling. Since handling must take precedence, the result with such systems is frequent driver irritation due to premature or unnecessary anti-lock operation.

Figure 3:
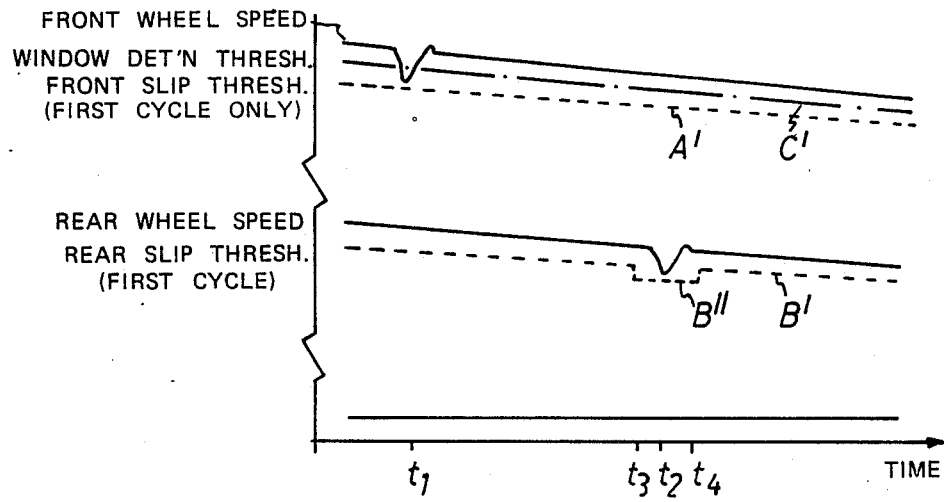
FIG. 3 illustrates graphically the operation of an anti-lock system embodying the present invention.

Referring now to FIG. 3, in the system in accordance with the present invention, the front slip threshold for triggering anti-lock operation on the first cycle is still set sufficiently high (chain line A') not to be triggered by the road bump occurring at time $t_1$. However, the fact that a road bump has occurred is detected using a "window" detection threshold indicated by dash-dot line C. A calculation is then made, based on prevailing operational details, to determine a time $t_3$ just before the bump detected at the front wheel will reach the rear wheel and the rear wheel anti-lock detector is arranged to be desensitised for a "window" period starting from this calculated time $t_3$ and ending at time $t_4$ when the bump will have passed the rear wheel. Thus, during the period of de-sensitisation ($t_4-t_3$), the threshold line B' is dropped to a lower level B".

Figure 4:
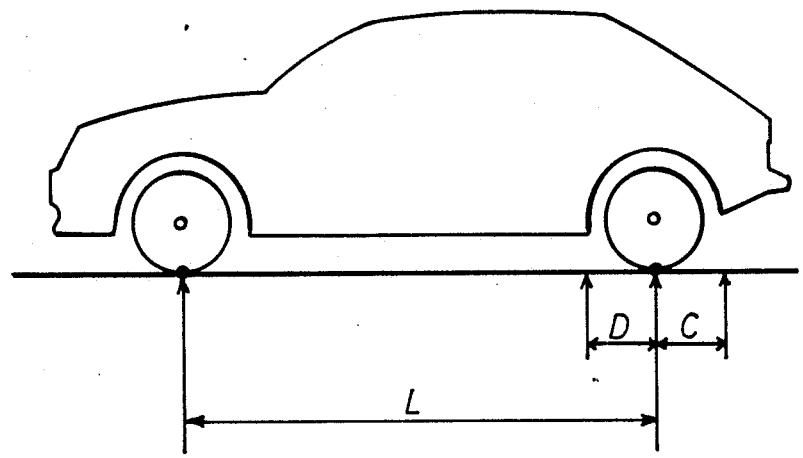
FIG. 4 is a diagrammatic side elevation of a typical vehicle for use in illustrating the operation of the present anti-lock system.

In order to keep the de-sensitisation period ($t_4-t_3$) as short as possible, the imminent arrival of the rear wheel at the bump can be predicted by solving either the standard equation $s=ut+\frac{1}{2}at^2$ to derive the time before the wheel reaches the bump or, preferably, by integrating a vehicle reference speed over successive measurement periods until the accumulated total s=(wheelbase L—error margin O). FIG. 4 indicates the wheel base L of the vehicle with the travel distance (O+C) over which the rear wheel is expected to move during the de-sensitisation period of the rear wheel anti-lock system.

Figure 5:
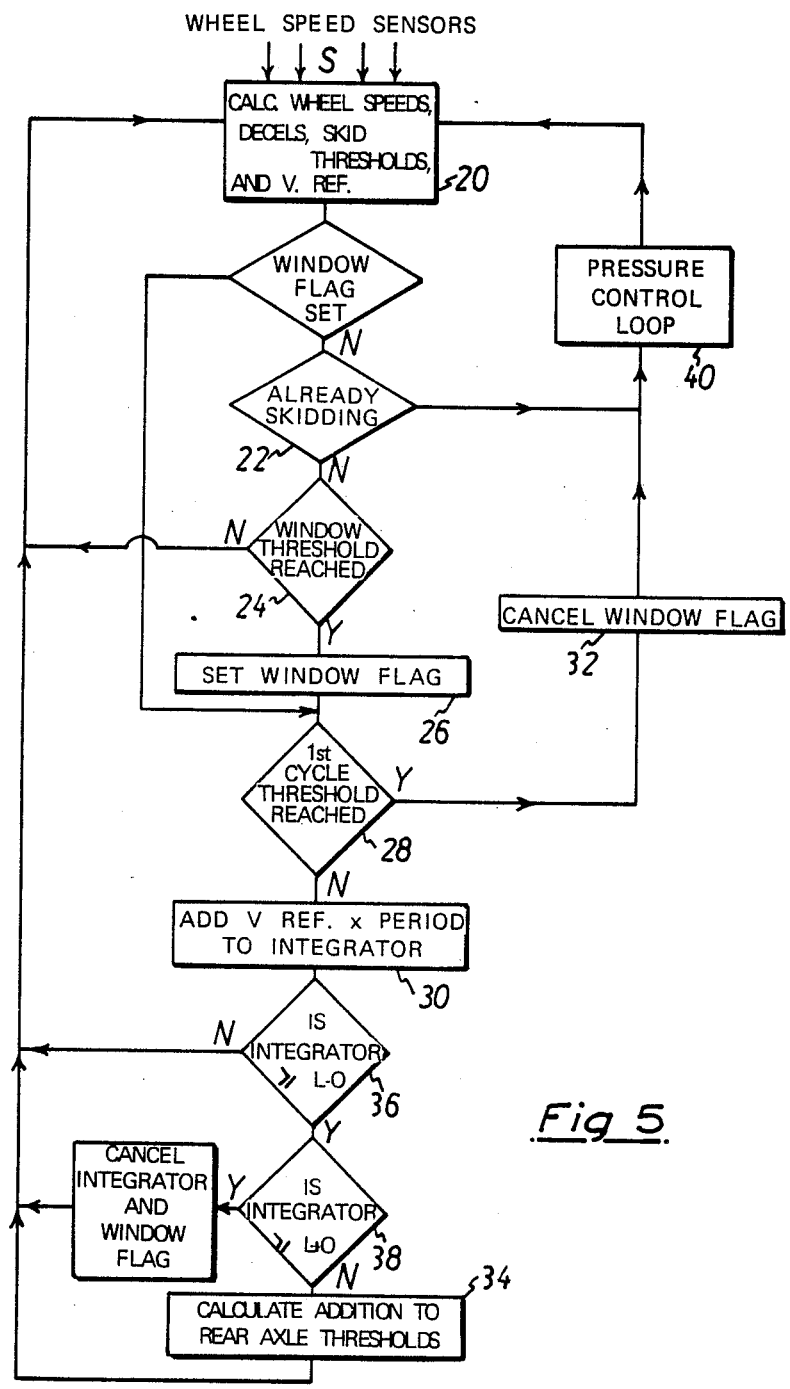
FIG. 5 is a flow-chart illustrating the operation of one possible embodiment of this invention.

FIG. 5 is a flow diagram illustrating one possible manner in which the de-sensitisation period may be calculated using the control computer of the anti-lock system.

Signals from the various conventional wheel speed sensors are input to the computer as indicated by arrows s and the various wheel speeds and deceleration values for each wheel are monitored and compared with established skid thresholds and the vehicle reference speed $V_{REF}$ (box 20).

If it is determined (box 22) that the vehicle is already in a skid condition then the normal pressure control loop 14 (i.e. solenoid valve 12, brake actuator 11, speed sensor 17 and control unit 15) assumes control. However, if a skid condition is not already present (box 12) and if the window threshold of FIG. 3 has been reached (box 24), then a window flag is set (box 26). Provided that the first cycle threshold has not been exceeded (box 28) then an integrator (box 30) is started which establishes the points L−O (box 36) and L+C (box 38) between which it is anticipated that the bump will pass the rear wheel(s) and therefore during which the rear wheel skid threshold is to be increased (de-sensitised) in box 34. Should the first cycle threshold have been reached (box 28) then the window flag is cancelled (box 32) and anti-lock control by the pressure control loop (box 40) applies.

In this manner, the rear axle sensitivity can be set to a level necessary to provide a safe handling, but the anti-lock system will not be invoked prematurely by single bumps.

I claim:

1. In an anti-lock system for vehicle brakes of the type wherein a computer is used to process data received from wheel speed transducers and to control the release of the brake of a particular wheel when the deceleration of that wheel exceeds predetermined thresholds, the improvement comprising means effective during periods that anti-lock is not currently evoked, to detect the presence of a road bump at the front axle and to cause the rear axle anti-lock system to be temporarily de-sensitised just before it would be expected, on the basis of speed and wheel-base, to reach the same bump.

2. An anti-lock system according to claim 1, comprising means effective to detect and recognise a bump at the front axle by identifying those occasions when front wheel speed deviation exceeds a predetermined "window" threshold level, which is chosen to correspond to the bump severity needed to overcome the normal rear axle "first cycle" threshold but which does not meet preselected criteria needed to evoke the front axle anti-lock system.

3. An anti-lock system as claimed in claim 1 or 2, including means for predicting the imminent arrival of the rear wheel at the detected bump on the basis of the formula $s=ut+\frac{1}{2}at^2$, where s=distance (wheelbase—error margin), u=current velocity, a=acceleration/deceleration and t=time before wheel hits bump.

4. An anti-lock system according to claim 2, including integrating means for predicting the imminent arrival of the rear wheel at the detected bump by integrating the vehicle speed over successive measurement periods until the accumulated total s=vehicle wheelbase-a predetermined error margin.

* * * * *